March 31, 1970 G. P. A. BATTAIL ET AL 3,504,292

DEMODULATOR FOR LOW-LEVEL FREQUENCY-MODULATED WAVES USING SHORT-TERM MULTIPLE RESONATOR SPECIAL ANALYZER

Filed Sept. 28, 1967 4 Sheets-Sheet 1

March 31, 1970 G. P. A. BATTAIL ET AL 3,504,292

DEMODULATOR FOR LOW-LEVEL FREQUENCY-MODULATED WAVES USING SHORT-TERM MULTIPLE RESONATOR SPECIAL ANALYZER

Filed Sept. 28, 1967 4 Sheets-Sheet 2

March 31, 1970 G. P. A. BATTAIL ET AL 3,504,292

DEMODULATOR FOR LOW-LEVEL FREQUENCY-MODULATED WAVES USING SHORT-TERM MULTIPLE RESONATOR SPECIAL ANALYZER

Filed Sept. 28, 1967 4 Sheets-Sheet 3

March 31, 1970 G. P. A. BATTAIL ET AL 3,504,292

DEMODULATOR FOR LOW-LEVEL FREQUENCY-MODULATED WAVES USING SHORT-TERM MULTIPLE RESONATOR SPECIAL ANALYZER

Filed Sept. 28, 1967 4 Sheets-Sheet 4

United States Patent Office 3,504,292
Patented Mar. 31, 1970

3,504,292
DEMODULATOR FOR LOW-LEVEL FREQUENCY-MODULATED WAVES USING SHORT-TERM MULTIPLE RESONATOR SPECIAL ANALYZER

Gerard Pierre Adolphe Battail, 30 Boulevard du Temple, Paris 11, France, and Pierre Claude Brossard, 9 Rue des Fleurs, 78 Montigny-le-Bretonneux, France Filed Sept. 28, 1967, Ser. No. 671,285
Claims priority, application France, Oct. 10, 1966, 79,351
Int. Cl. G01r *23/16;* H03d *3/04*
U.S. Cl. 329—112 8 Claims

ABSTRACT OF THE DISCLOSURE

A low-noise demodulator for a received frequency-modulated wave, of the type including a short-term analyzer roughly measuring the instantaneous frequency and delivering an estimated modulating signal approximating the true modulation of said wave, in which another wave from a local oscillator is frequency-modulated by said estimated signal and is combined with the delayed received wave, and in which the combined wave is finally demodulated to obtain the true modulation of said received wave, said analyzer using two or three damped resonators across which response signals are developed, characterized by an arrangement of said analyzer comprising a mixer circuit fed from the received wave and an auxiliary oscillator and feeding said resonators, means for combining pairs of said response signals into difference signals, further means for combining each of said difference signals with one of said response signals to obtain further signals, and means for combining said further signals into said estimated modulating signal which in turn frequency-modulates said auxiliary oscillator.

BACKGROUND OF THE INVENTION

Field of the invention

This invention has for its objects improvements in the arrangements described in the U.S. Patents 3,217,262 issued Nov. 9, 1965 and 3,324,400 issued June 6, 1966, both granted to the present Applicants for low noise frequency-modulated wave detectors.

The invention relates to a new design of a short-term spectral analyzer included in a network delivering an estimated modulating signal for a frequency-modulated wave detector of the type described in the above-cited patents, which will be designated hereinafter, for short, as "the first and second cited patents."

Description of the prior art

It will be recalled that a demodulator of the type cited in the first of the above described patents comprises the following elements:

(1) A network for roughly estimating the instantaneous frequency of the signal to be demodulated, called "short-term spectral analyzer" and which itself consists of:

(1.1) A number of damped resonators whose resonant frequencies are distributed on either side of the middle carrier frequency of the frequency modulated wave to be demodulated, the distribution being made with a certain spacing within the limits of the frequency band covered by this wave;

(1.2) An apparatus permitting the amplitudes of the response signals respectively developed across said resonators to be compared at each instant, and permitting those of the resonators which show the highest amplitude signal to be chosen;

(1.3) An apparatus supplying a voltage representing the rank of the resonator thus chosen, and at whose terminals a step-shaped signal thus appears, each step corresponding to one resonator;

(1.4) A filtering or smoothing device which transforms the stepped signal mentioned above into a continuous signal, called the "estimated modulating signal"; this latter substantially occupies the same frequency band as the modulating signal of the received wave;

(1.5) A local oscillator, of frequency different from the carrier frequency of the signal to be demodulated, and frequency-modulated by the estimated modulating signal. This local oscillator, connected to one of the inputs of a mixer, supplies a signal called "estimated frequency-modulated signal";

(2) A delay line whose input is connected in parallel with that of the estimating network referred to in paragraph (1). This line, supplied with the signal to be demodulated, has a delay substantially equal to the time necessary for the formation of the estimated signal. The output of this same delay line feeds into the other input of the mixer mentioned in (1.5);

(3) A conventional filter and frequency demodulation chain, centered on a frequency equal to the difference between the carrier frequency of the wave to be demodulated and that of the local oscillator. The purpose of this chain is to demodulate only, the noise component being excepted, the difference between the true modulating signal and the estimated one; and (4) Means for reconstituting the true modulated signal, without the noise component, by adding the modulating signal, after the necessary corrections for amplitude and time, to the difference alluded to in (3).

The estimated modulating signal is obtained either by demodulating in the conventional way, the estimated modulated signal, that is to say the signal, issuing from the modulated local oscillator, which permits restitution of proper timing before this demodulation, or, by tapping off the estimated modulating signal before it modulates the local oscillator.

In the first cited patent three possible realisations of the estimating network were described, which are all of the incoherent type, that is to say, that in these embodiments the comparison of the responses of the various resonators only takes account of their amplitudes.

In the second cited patent an arrangement of the estimating network (or to be more precise, of the part of that network called "short-term spectral analyzer") was described, where the comparison of the responses of the resonators takes account of the phase relations between them. This arrangement is therefore of the so called coherent type.

In the latter arrangement, the response of the resonator for which the comparison shows the largest amplitude is taken as reference. The response of all the other resonators are thus compared to this largest amplitude. As soon as another of these responses appears to have become the largest one, it is substituted for the first as reference. Phase-shift networks bring into phase the responses of any two frequency-adjacent resonators when the incident signal has a frequency located at the common limit to their frequency bands. In this way, when the instantaneous frequency of the modulated signal, initially within the band of a particular resonator, varies and passes into the band of an adjacent resonator, the switching operation which substitutes, as reference wave, the response of the latter said resonator for that of the initial resonator, is made without phase discontinuity.

The comparison between the responses of the different resonators and the reference wave can thus be made continuously, in amplitude and phase, owing to the fact that the phase of the reference wave is continuously variable, although it is obtained by the juxtaposition of portions of the responses developed across successively chosen resonators.

SUMMARY OF THE INVENTION

The present invention relates to two types of embodiments of the device for short-term spectral analysis included in the estimating network. These two embodiments, both of the coherent type, are characterized by the provision of an auxiliary oscillator, whose frequency is variable as a function of a voltage which is applied to it. This oscillator feeds into the mixer (or frequency changer) operating upon the incident signal. The output of this mixer is connected to a bank of resonators having the same characteristics as those mentioned in connection with the arrangement of the short-term spectral analyzer network described in the second cited patent. The number of resonators is, however, reduced to three in the first embodiment and to two in the second, although the estimation which is carried out may comprise a larger number of quantizing levels, which permits of the demodulator's functioning for an arbitrarily large modulation index, despite the restriction to three or to two of the number of resonators. It will be recalled that modulation index is understood to mean the ratio of the maximum frequency sweep of the received signal to the maximum frequency of the modulating wave.

In the arrangements of the present invention, the resonators considered are fed, in parallel, with the product of the mixing of the incident signal and the signal issuing from the auxiliary oscillator. The coherent comparison between the responses of these resonators, shifted in phase with respect to each other, as was mentioned in the second cited patent, supplies the voltage which controls the frequency of the auxiliary oscillator. The amplitude and polarity of this signal are such that the resulting variation of the instantaneous frequency of the latter oscillator brings back the instantaneous frequency of the signal resulting from the mixing of the incident wave and of the signal issuing from this auxiliary oscillator to within a range of frequencies included within the overall band of the resonator bank, in such a manner that the said coherent comparison may be effected.

In the first arrangement, where the number of resonators is three, the response of the end resonators is compared in amplitude and phase with that of the middle resonator, taken as reference. The terms 'middle resonator' and 'end resonators' must be understood assuming that they are arranged in the order of their resonant frequencies.

When the amplitude of the component (shifted in phase) of the response of one of the end resonators which is in phase with the reference wave (response of middle resonator) exceeds the amplitude of that wave, the auxiliary oscillator undergoes a variation of frequency substantially equal to the bandwidth of the middle resonator, and this in such a direction that the product of the mixing of the incident wave and the auxiliary oscillator signal has its instantaneous frequency brought back within the middle resonator band.

The shifting of the local oscillator's frequency thus takes place every time when the variation of the instantaneous frequency has exceeded, in one direction or the other, a quantization step equal to the middle resonator bandwidth.

The successive frequency shifts of the auxiliary oscillator thus play the same part as the successive substitutions, one for another, of the responses of the resonators which, in the apparatus described in the second cited patent, are used to make up the reference wave.

The algebraic sum of the abovementioned frequency shifts of the auxiliary oscillator thus supplies an equivalent information to that of the rank of the resonator in resonance. It thus constitutes the quantified estimate of the modulating signal which it is desired to obtain. This estimate lacks a constant term; but the constant component of the modulating signals does not generally need to be transmitted.

The first embodiment of the short-term spectral analyzer network according to the invention thus constitutes a simplification of that described in the second cited patent, since it contains only three resonators.

In this form of the invention, the comparison between the reference wave and the responses of the end resonators is carried out costantly. No other switching than that required by the performing of such frequency shifts is therefore necessary. This is a considerable advantage since, as is known, the switching of a high frequency wave is a difficult operation to carry out rapidly.

Furthermore, the reduction in the number of resonators to three makes it possible, at the cost of a small complication in the apparatus, to eliminate a further disadvantage associated with the method of obtaining the reference wave described in connection with the arrangements described in the second cited patent.

Since the switching operations substitute one for another of the responses, suitably shifted in phase, of the resonators, in order to maintain as reference the phase shifted response of the resonator whose band contains, with the greatest probability, the instantaneous frequency of the modulated signal, the ideal functioning of the estimating network implies that the time which elapses between the instant of the choice of a new resonator and that of the substitution which this choice involves, should be negligible.

If this is not the case, the amplitude of the reference wave generally continues to decrease after this choice has beend made; the risks then increase, that a new, erroneous choice will be produced in the time interval which separates the choice from the effective carrying out of the substitution which it sets in motion, and that, of course, to the same extent as the amplitude of the reference wave decreases, whilst the noise power level (which disturbs the comparison from which the choices result) obviously remains unchanged.

In the first embodiment of the short-term spectral analyzer network of the invention, a disadvantage of the same kind would arise in the case where one confined oneself to performing the functions mentioned, that is to say, to comparing the resonses of the end resonators with that of the middle resonator, taken as reference, in order to set in motion the operation of changing the frequency of the auxiliary oscillator. In fact, a certain interval of time elapses between the instant when the comparison of one of the end resonator's responses commands the said shifting of the instantaneous frequency of the auxiliary oscillator and the instant when this shifting is effectively carried out.

In the general case, this operation is set in motion by the fact of the instantaneous frequency passing from the band of the middle resonator into that of one of the end resonators. During the response time of the system, the response of the middle resonator is obviously weakened as soon as the instanteous frequency is no longer equal to its resonant frequency. As a result of this, there can exist during this response time a risk of error if the weakened response of the middle resonator is compared to the response of the other end resonator. Such an error is avoided by comparing the response of the end resonators with each other.

The first embodiment of the invention thus comprises, apart from the devices for comparison between the responses of the end resonators and that of the middle resonator, means for comparing, between themselves, the responses of the two end resonators and means of preventing a possible error of the abovementioned type, utilising the results of this latter comparison.

Inasmuch as the response of one of the end resonators remains predominant, it is clear that the comparison of the responses of the end resonators will indicate it; this latter can be used to prohibit the comparison between the middle resonator response and that of the other end resonator being made erroneously, in favor of this latter. In other words, the comparison between the middle resonator response and that of one of the end resonators, when it involves the choice of the response of the said end resonator, is only allowed to command the shifting of frequency of the axiliary oscillator when it is confirmed by the comparison of the responses of the end resonators.

The second embodiment of the short-term spectral analysis network according to the invention constitutes a more radical simplification of the short-term spectral analyzer device described in the second cited patent. It brings into play only two resonators. It comprises:

An auxiliary oscillator modulated in frequency by the component of the response of one of the resonators which is in phase with that of the other resonator;

A mixer fed, on the one hand, by the wave issuing from the auxiliary oscillator, and on the other hand, by the incident wave, the direction and amplitude of the modulation of the said auxiliary oscillator being such that the instantaneous frequency of the signal issuing from the mixer and applied in parallel to the two resonators is controlled so as to remain in the vicinity of the common limit of their bands.

The signal which modulates the auxiliary oscillator forms the estimated signal.

The design of this second embodiment of the shoft-term spectral analysis network according to the invention thus approaches that of the regenerative frequency sweep demodulators, such as those described in the article entitled "Decreasing the threshold in F.M. by feedback," by L. H. Enloe, which appeared in the review "Proceedings Institute of Radio Engineers," January 1962, volume 50, No. 1, pages 18 to 30. It differs therefrom in that the signal which modulates the auxiliary oscillator is obtained by synchronous demodulation of the response of one resonator with respect to another (and not by conventional demodulation) also by the absence of a limiter device. The synchronous demodulation does not give linearity comparable t othat of conventional frequency domodulation; but, being coherent, it provides better protection against noise.

The poor linearity and the absence of suppression of amplitude modulation (since the device according to the invention does not incorporate any limiter) are acceptable since the estimated signal—and not the finally demodulated signal—results from its functioning. In fact, according to the invention described in the first cited patent, this distortion is iliminated from the product of the demodulation, once the latter is carried out.

Moreover, a regenerative frequency sweep demodulator, owing to the fact that it improves the response threshold, could be used as an estimating network in the demodulator, subject of the first above-cited patent. In that case, since it plays the part of an estimating network and not that of a demodulator, this device can be built with a low "loop gain"; this will procure, at one and the same time, good protection against noise but strong distortion, which is permissible for an estimating network, but not for demodulator.

However, the device according to the second embodiment of the present invention is, at one and the same time, simpler and more effective, as to its estimating network, than such a regenerative frequency sweep demodulator. Moreover, it shares certain defects with the latter such as those associated with stability problems and control difficulties. Further, it does not attain the performance obtained with the devices of more complex design described in the second above cited patent and the first embodiment of the present invention.

The preceding considerations take no account of the delay of the resonator's responses with respect to their excitations. It has, in fact, been assumed that the variations in a response would immediately and faithfully reproduce those of the instantaneous frequency. In reality, it is not so. The functioning of the first embodiment of the invention involves simply that, when the comparison of the responses of one of the end resonators with that of the middle resonator becomes favorable to the end resonator, the control of the frequency variation of the auxiliary oscillator should be effective at the end of a time interval shorter than the time required by the scanning of the middle resonator band (assuming, for example, that the instantaneous frequency varies linearly).

The delay of the response relative to the excitation does not intervene directly, and the condition mentioned is comparatively easy to fulfill; in fact, it is sufficient to make use of circuits whose speed of functioning is sufficiently high.

For the second embodiment, on the other hand, the delay of the response relative to the excitation must indeed be kept shorter than the time of scanning of the band of a resonator; it leads to a widening of that band, relative to the value most favorable for protection against noise.

The invention will be better understood by reading the detailed description given hereafter, together with the attached drawings, in which:

DESCRIPTION OF PREFERRED EMBODIMENTS

Figure 1:
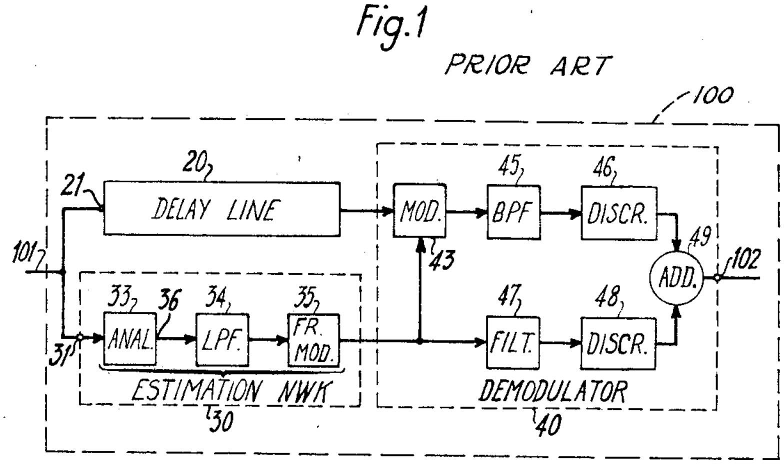
FIGURE 1 is a block schematic diagram of a frequency modulated signal demodulator, according to the first above cited patent.

Referring to FIGURE 1, which represents the block diagram of a demodulator of frequency modulated signals in accordance with the first cited patent, the demodulator as an assembly is designated as 100, and its inlet 101.

The demodulator inlet 101 is connected in parallel to the inlet 31 of an estimating network 30, and to the inlet 21 of a delay line 20.

The estimating network 30 comprises three circuits in series, namely:

A short-term spectral analysis network 33, given a novel design according to the present invention;

A low-pass filter 34, intended to smooth the output signal of the network 33;

A frequency modulator 35.

The two signals issuing from the network 30 and the delay line 20 are each applied to the two inlets of a mixer 43 forming part of the modulator proper, 40. The output signal of the mixer 43 is then applied to a band-pass filter 45 whose passing band has a width substantially equal to twice the width of the base frequency band of the modulating signal.

At the output of the filter 45, the wave is demodulated by a conventional type discriminator, 46. The result of this demodulation is solely the difference between the modulating signal itself and its estimation given by the network 33.

To this difference, the estimate of the modulating signal, deduced by demodulation of the estimate of the frequency modulated signal must be added, in order to obtain the signal itself. For this purpose, the estimated modulated signal is led to the output terminals of the network 30; it is smoothed in the filter 47 and demodulated in the discriminator 48. The estimated modulating signal is then applied to the addition network 49 at the same time as the signal issuing from the discriminator 46.

The output terminals 102 of this addition network 49 are also the output terminals of the portion 40 of the demodulator 100.

Figure 2:
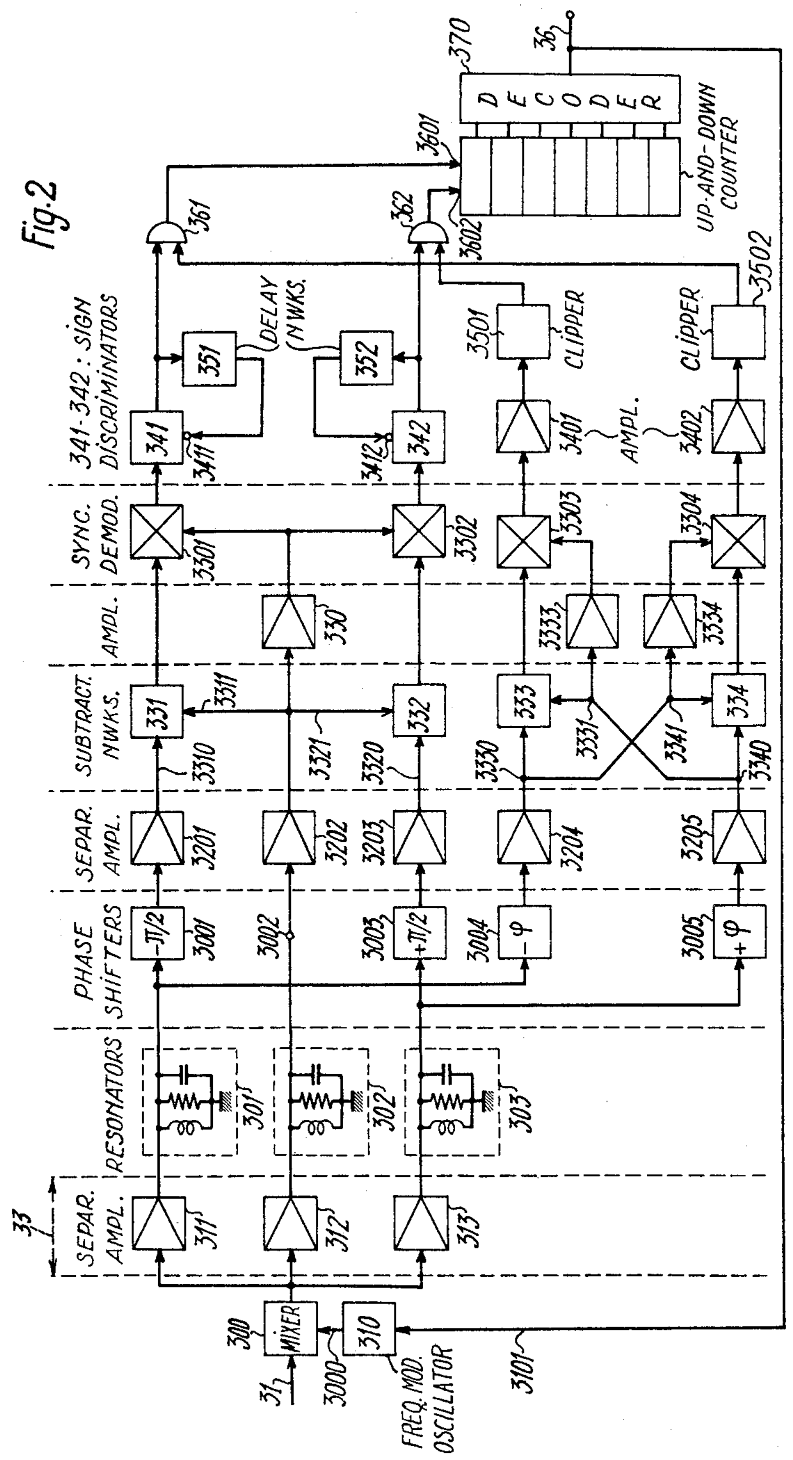
FIGURE 2 is a block-schematic diagram of a short-term spectral analysis device modified in accordance with the first type of embodiment of the invention.

FIGURE 2 represents the block diagram of the short-term spectral analysis device 33, modified in accordance with the first embodiment of the invention.

The frequency modulated signal is applied to the inlet 31 of the short-term spectral analysis network 33. This inlet is also that of a mixer 300 whose other inlet 3000 receives the signal from the frequency modulated oscillator 310. It will be assumed that the frequency issuing from the mixer 300 is equal to the difference between the frequency of the signal applied to its inlet 31 and that of the signal applied to its other inlet 3000, issuing from the oscillator 310.

The signal leaving the mixer 300 feeds the separator amplifier 311, 312 and 313 in parallel. The outlets of these are connected respectively to the resonators 301, 302, 303. The middle frequencies of these resonators, taken in order of the reference numbers, are equally spaced and arranged in increasing order. The bandwidth of the resonators 301, 302, 303, at half-power, is equal to the spacing of the middle frequencies of two of the neighboring resonators.

Resonator 301 is connected in parallel to the input of the phase-shifting networks 3001 and 3004. Resonator 302 is connected directly to the input of the separator amplifier 3202. The resonator 303 is connected in parallel to the input of the phase-shift networks 3003, 3005.

The phase-shifts of the networks 3001 and 3003 are equal respectively to $-\pi/2$ and $+\pi/2$ radians; the phase-shifts of networks 3004 and 3005 are equal respectively to $-\varphi_0$ and $+\varphi_0$; the angle $\varphi_0$ is equal to $\tan^{-1}(2)$ about 63 degrees 30 minutes).

The value of this angle $\varphi_0$ is justified as follows:

Let R, L, C be the values of, respectively, the resistor, the inductance coil and the capacitor which, connected in parallel, constitute a resonator. The admittance of the resonator is given by the expression $$Y=\frac{1}{R}\left[1-j\frac{R}{2\pi F_0 L}\left(\frac{F_0^2-F^2}{F_0 F}\right)\right]$$

where $j$ is $\sqrt{-1}$ and $F_0$ is equal to $1/\sqrt{LC}$.

Putting $Q=R/2\pi F_0 L$, it can be seen that the phase-shift produced by a resonator is given, except for its sign, by:

$$\tan \varphi=Q\frac{F_0^2-F^2}{F_0 F}$$

In the vicinity of the frequency $F_0$, which is substantially the resonant frequency of a resonator, we may write, very approximately;

$$\tan \varphi \approx 2Q\frac{\Delta F}{F_0}$$

putting $\Delta F=F_0-F$.

Figure 3:
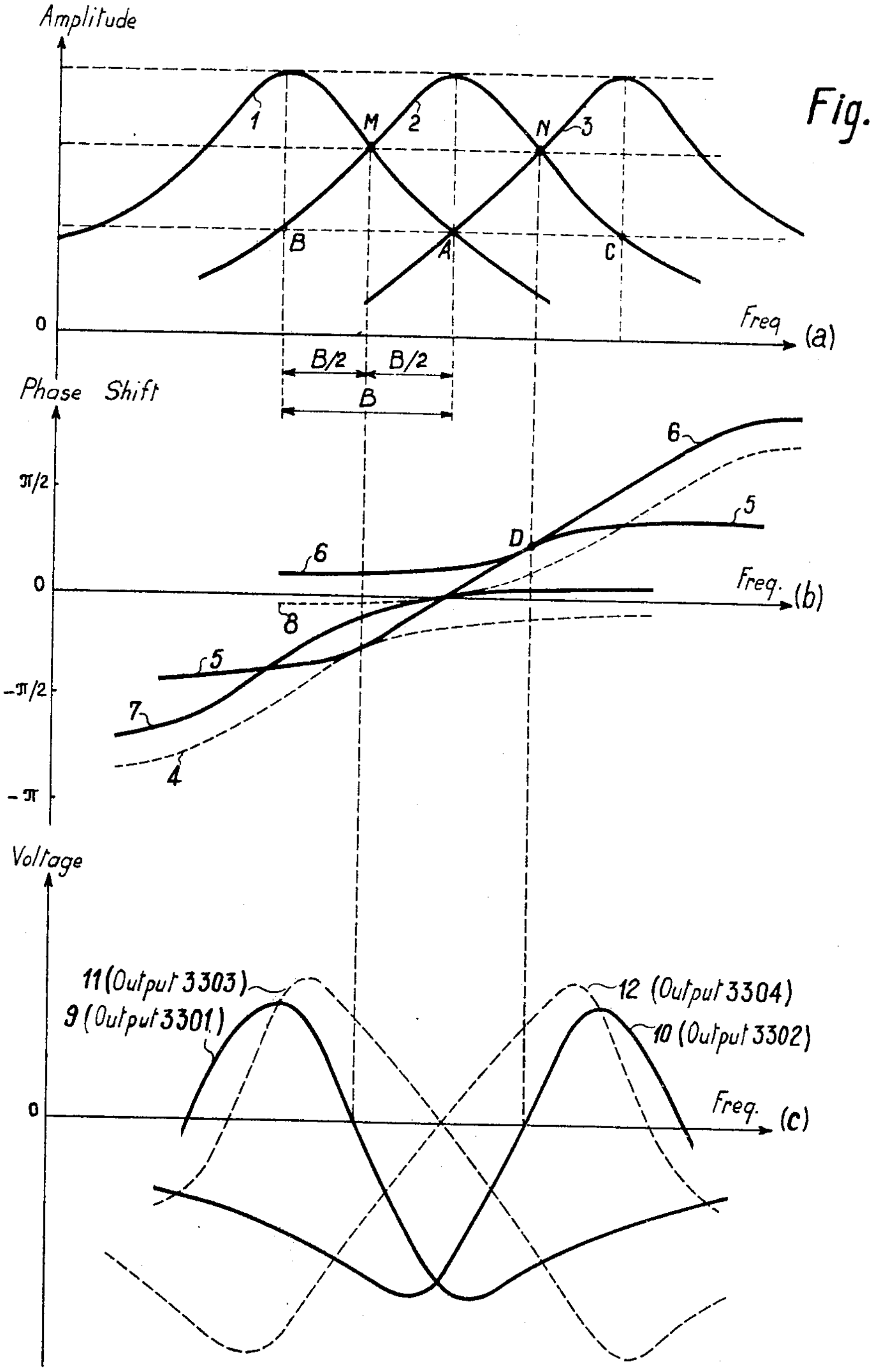
FIGURE 3 is a set of graphs illustrating the amplitude and phase-shift of the responses of the resonators employed in the device according to the first type of embodiment of the invention as a function of the frequency of the incident wave, together with other values occurring in its functioning.

Referring now to FIGURE 3, line *a*, where the curves 1, 2, 3 represent in amplitude the responses, respectively, of the resonators 301, 302, 303 of FIGURE 2, it can be seen that the curves 1 and 3 of resonators 301 and 303 intersect at A, whose abscissa is equal to that of the resonant frequency of resonatod 302. We may define the "bandwidth" of this resonator 2 as the width BC/2 obtained by the horizontal passing through A and meeting curve 2 that points B and C, whose abscissae are respectively equal to the resonant frequencies of curves 1 and 3.

At the points M and N, the transition between the resonators 302, 303 is made with the phase-shift $\varphi_1$, such that:

$$\tan \varphi_1=2Q\frac{B/2}{2\pi F_0}=Q\cdot\frac{B}{2\pi F_0}$$

At the point A, the transition between the resonators 301, 303 is made with the phase-shift $\varphi_0$ such that:

$$\tan \varphi_0=2Q\frac{B}{2\pi F_0}$$

and consequently:

$$\tan \varphi_0=2 \tan \varphi_1$$

If as stated in the second above cited patent, it is assumed, as an example not intended to be taken restrictively, that the resonators 301, 302, 303 are resonant circuits with the bandwidth at 3 decibels equal to the spacing of the resonant frequencies of the two adjacent resonators, the phase-shift, relative to the exciting signal, varies within the said band from $$-\frac{\pi}{4} \text{ to } \frac{\pi}{4}$$

radians.

In this case $\tan \varphi_1=1$ and consequently:

$\tan \varphi_0=2$ from which $\varphi_0$ approximately equal to 63°30′

The outputs of the phase shifters 3001–3005 are connected respectively with the inputs of the separator amplifiers 3201–3205.

The outputs of the separator amplifiers 3201, 3203 are connected respectively with the inlets 3310 and 3320 of the subtraction networks 331, 332.

The output of the separator amplifier 3202 is connected in parallel, on the one hand to the inlet of the amplifier 330, and on the other hand to the second inlets 3311 and 3321 of the subtraction networks 331, 332. The output of the separator amplifier 3204 is connected in parallel to the inlet 3330 of the subtraction network 333 and with the common inlet 3341 to the subtraction networks 334 and to the amplifier 3334. The output of the separator amplifier 3205 is connected in parallel to the inlet 3340 of the subtraction network 334 and to the common inlet 3331 to the subtraction network 333 and to the amplifier 3333.

The output of the subtraction network 331 is connected to the signal input of the synchronous demodulator 3301. The output of the subtraction network 332 is connected to the signal input of the synchronous demodulator 3302. The output of the amplifier 330 is connected in parallel with the carrier inputs of the synchronous demodulators 3301, 3302. The outputs of the subtraction networks 333, 334 are connected respectively to the signal inputs of the synchronous demondulators 3303, 3304. The outputs of the amplifiers 3333, 3334 are connected respectively to the carrier inputs of the synchronous demodulators 3303, 3304.

It will be recalled that a synchronous demodulator is understood to be a device with two inputs, signal input and carrier input and one output, such that the voltage at its output is proportional to the component of the signal applied at the signal input which is in phase with the signal applied to the carrier input.

The outputs of the synchronous demodulators 3301, 3302 are connected to the sign discriminators 341 and 342 respectively. These latter transmit an impulse of, for example, positive polarity, as soon as the sign of the voltage applied to their input terminals becomes positive.

The outputs of the sign discriminators 341 and 342 are respectively connected in parallel on the one hand to one of the inputs of the AND-gates 361, 362, and on the other hand to the inputs of the delay circuits 351, 352. The outputs of the delay circuits 351, 352 are connected respectively to the feedback inputs 3411, 3412 of the sign discriminators 341, 342. In fact, when a sign discriminator has transmitted an impulse, it is necessary in order for it to be ready to function again, that an impulse be applied to its feedback input.

The outputs of the synchronous demodulators 3303, 3304 are connected respectively to the amplifier-inverters 3401, 3402 which feed the clippers 3501, 3502 respectively. These latter are connected to the other input of the AND-gates 361, 362. The outputs of the AND-gates 361, 362 are connected to the inputs 3601, 3602 of counter 360, which can be, for example, a stepping counter comprising as many steps as the estimation comprises quantization levels; 3601 is the deducting input, whilst 3602 is the counting-up input.

The counter is connected at each of its stages to the local decoder 370, which transmits a voltage proportional to the contents of the said counter, that is to say, to the number of impulses applied to its counting-up input 3602 less the number of impulses applied to its deducting input 3601.

The output of the local decoder 370 is connected on the one hand to the output terminals 36 of the short-term spectral analysis network 33, and on the other hand to input 3101 of the oscillator 310, which receives the signal which controls its frequency.

The functioning of this device, according to the first embodiment of the invention, will now be explained in relation to the diagrams shown on FIGURE 3.

These diagrams give various values of interest in the functioning of the device, as a function of the frequency of the signal applied, in parallel, to the three resonators 301, 302, 303 (FIGURE 2).

The curves 1, 2, 3 of FIGURE 3, line *a*, show, as has already been mentioned, the respective responses in amplitude of the resonators 301, 302, 303.

The curves 4, 5, 6, of FIGURE 3, line *b*, show the phase-shift between the response of the resonators 301, 302, 303 when its phase is shifted by the networks 3001, 3002, 3003 with respect to the incident wave, and the curves 7, 8 of FIGURE 3, line *b*, show the phase-shift between the response of the resonators 301, 303 when its phase is shifted by the networks 3004, 3005 with respect to the incident wave.

The curves 9, 10, 11, 12 of FIGURE 3, line *c*, show the voltage obtained at the output of the synchronous demodulators 3301, 3302, 3303, 3304 respectively.

It will be assumed that initially, the frequency of the signal issuing from the mixer 300 (that is to say, the difference between the frequency of the incident signal applied to the input 31 of the short-term spectral analysis device 33 and that of the oscillator 310) is included within the frequency band of the central resonator 302. Furthermore, it will be assumed that, subsequently, the frequency of the incident signal applied to the input 31 varies, for example, may increase so that the frequency of the wave issuing from the mixer 300 reaches and exceeds the common limit to the frequency bands of the resonators 302 and 303, and thus enters into the band of the resonator 303. Further, it will be assumed that the said variation in frequency occurs sufficiently slowly for the response of the different circuits to a stationary signal to represent with validity their response to the applied signal.

Consequently, the amplitude of the signal issuing from the separator amplifier 3202 decreases, and the amplitude of the signal issuing from the amplifier separator 3203 increases (curves 2 and 3). On the other hand, as curves 5 and 6 show, the mutual phase-shift of the signals issuing from the said separators 3202 3203, is zero at the frequency which corresponds to the common limit to the frequency bands of the resonators 302, 303 (point D). This phase-shift is about zero in the neighborhood of this frequency.

The subtraction network 332 effects the subtraction of the signals leaving the amplifiers 3202, 3203. This difference undergoes, in the synchronous demodulator 3302, a coherent demodulation with respect to the signal issuing from the amplifier 3202. The product of demodulation, leaving the demodulator 3302, is represented as a function of the frequency of the signal issuing from the mixer 300, by curve 10.

This curve shows that when the instantaneous frequency of the exciting signal reaches the upper limit of the band of the middle resonator 302 (point N), the voltage at the output terminals of the synchronous demodulator 3302 becomes positive. The sign discriminator 342 therefore transmits an impulse of positive polarity, for example, which is applied in parallel on the one hand, to one of the inputs of the AND-gate 362, and on the other hand to the delay device 352; the output of this latter, being connected to the feedback input 3412 of the discriminator 342, resets it to zero.

The abovementioned input finds the AND-gate 362 open, owing to the fact that the signal applied to the second input of this gate is of positive polarity, since it is deducted, by inversion in the amplifier 3401 and clipping in the clipper 3501, from the signal issuing from the synchronous demodulator 3303. The latter signal is represented by curve 11 of FIGURE 3, line *c*; it is of negative polarity for the frequency in question. The generation of this signal will be described in detail hereafter.

A blocking effect is thus seen to be exercised by the comparison of the responses of the two end resonators 301, 303 in relation to the impulse issuing from the sign discriminator 342, which receives information on the comparison between the end resonator 303 and the middle resonator 302.

As already mentioned, the output of the AND-gate 362 is connected to the counting input 3602 of the counter 360. The contents of the counter are transformed into a voltage by the decoding network 370, and the voltage obtained is applied on the one hand to the output 36 of the short-term spectral analysis network 33, and on the other hand to the modulation input 3101 of the frequency modulated local oscillator 310.

This voltage thus increases by one step, and the result of this for the local oscillator 310 is a rapid variation of its instantaneous frequency, of which the direction is chosen in such a way that the frequency of the signal obtained by mixing the incident signal applied to the input 31 of the mixer 300 and the signal issuing from the oscillator 310 and applied to the input 3000 of the same mixer 300, returns to within the frequency band of the middle resonator 302.

The impulse issuing from the sign discriminator 342 undergoes a delay in the delay device 352, of longer duration than the time necessary for the instantaneous frequency variation of the signal exciting the resonators 301, 302, 303, due to that of the oscillator 310, to have taken place after the response of the resonators 302, 303 to the variation mentioned has brought back to a negative value the voltage at the output terminals of the synchronous demdoulator 3302. If this were not the case, several successive counting impulses would be registed by the counter 360.

If instead of increasing, the instantaneous frequency of the incident signal decreases, the functioning of the device in this case can be deduced at once from the preceding description in the corresponding manner.

The generation of the signal issuing from the demodulator 3303 will now be described in detail. It has been seen that when the instantaneous frequency of the wave applied to the resonators passes from the band of the resonator 302 into the band of the resonator 303, the sign discriminator 342 sends an impulse of positive polarity to one of the inputs of the AND-gate 362.

In the synchronous demodulator 3303, the response of the resonator 301 is compared with that of the resonator 303 taken as reference. When the instantaneous frequency is within the band of the said resonator 303, the synchronous modulator 3303 delivers a voltage of negative polarity (curve 11) which has its polarity inverted by the amplifier inverter 3401; subsequently it is clipped in the limiter 3501. The second input of the AND-gate 362 is therefore strongly influenced by a positive voltage which thus brings the said gate into its "passing" state. If a period of noise appears in the resonator 301 before the signal, leaving the AND-gate 362, is elicited by means of the counter 360 and the decoding network 370, the variation of the frequency of the oscillator 310, the sign discriminator 341 can take effect and send an impulse of positive polarity to one of the inputs of the AND-gate 361.

Owing to the fact that the instantaneous frequency has remained within the band of the resonator 303, the synchronous demodulator 3304 compares the response of the said resonator 303 with that of the resonator 301 taken as reference. The result of this is that the synchronous demodulator 3304 delivers a voltage of positive polarity (curve 12). The response of the resonator 303 to the instantaneous frequency is at a higher level than that of the response of the resonator 302, whilst the response of the resonator 301 undergoing the period of noise is at the same level.

It is therefore possible that the response of the resonator 301, compared with that of the resonator 302 (reference) may be a voltage of positive polarity, whilst the response of the resonator 303 compared to that of resonator 301 (reference) may equally be a voltage of positive polarity. The synchronous demodulator 3304 supplying a voltage of positive polarity, the amplifier 3402 supplies a voltage of negative polarity, which after clipping by the clipper 3502, is applied to one of the inputs of the AND-gate 361; the latter therefore remains blocked.

The impulse transmitted by the sign discriminator 341, owing to the presence of noise, cannot therefore be fed into the counter 360.

Figure 4:
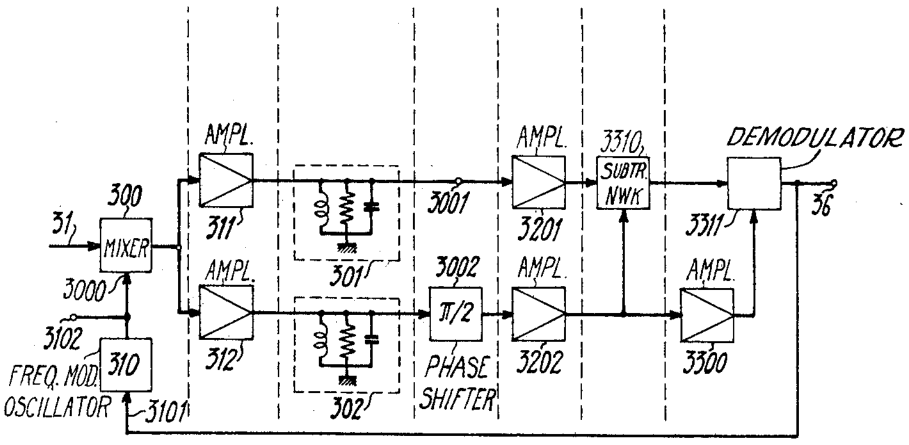
FIGURE 4 is a block-schematic diagram of the short-term spectral analysis device modified in accordance with the second type of embodiment of the invention.

FIGURE 4 shows, in the form of a block diagram, the short-term spectral analysis device modified according to the second embodiment of the invention. In this second embodiment the incident signal, applied to the input 31 of the short-term spectral analysis network, undergoes first a change of frequency by means of mixer 300, to which is connected, at its input 3000, the frequency modulated oscillator 310.

It will be assumed, in the same manner as in the case of FIGURE 2, that the frequency of the signal issuing from the mixer 300 is equal to the difference between the frequency of the signal applied to its input 31, and the frequency of the oscillator 310.

The signal supplied by the mixer 300 is applied in parallel to the separator amplifiers 311 and 312, which are connected respectively to the resonators 301 and 302.

The response of these resonators 301 and 302 is first shifted in phase by the networks 3001, 3002; 3001 giving a phase-shift of angle zero (direct connection) and 3002 a phase-shift of an angle $\pi/2$ radians. It is subsequently applied to the separator amplifiers 3201, 3202.

The subtraction network 3310 receives respectively, at its two inputs, the signals issuing from the separator amplifiers 3201, 3202. It thus produces the difference between the first and the second signal, for example. This difference is applied to the signal input of the demodulator 3311, which receives in addition, through its carrier input, the signal supplied by the separator 3202 and amplified by the amplifier 3300.

The signal leaving the synchronous demodulator 3311 is applied on the one hand to the output terminals 36 of the short-term spectral analysis network 33', and on the other hand to the modulation input 3101 of the oscillator 310.

It may be useful to notice that the short-term spectral analysis device 33' comprises a frequency modulated local oscillator 310, and that the signal which issues from it is not quantized, and that consequently it does not need of smoothing. At the output 3102 of the local oscillator 310, therefore, a signal appears, modulated in frequency by the estimated signal.

The short-term spectral analysis device 33', considered between its input terminals 31 and the output terminals 3102 of the local oscillator 310, thus carries out the same functions as the complete device, called the estimation network 30, shown on FIGURE 1. It can therefore be substituted for the said network 30; the terminals 36 in this case not being used.

Figure 5:
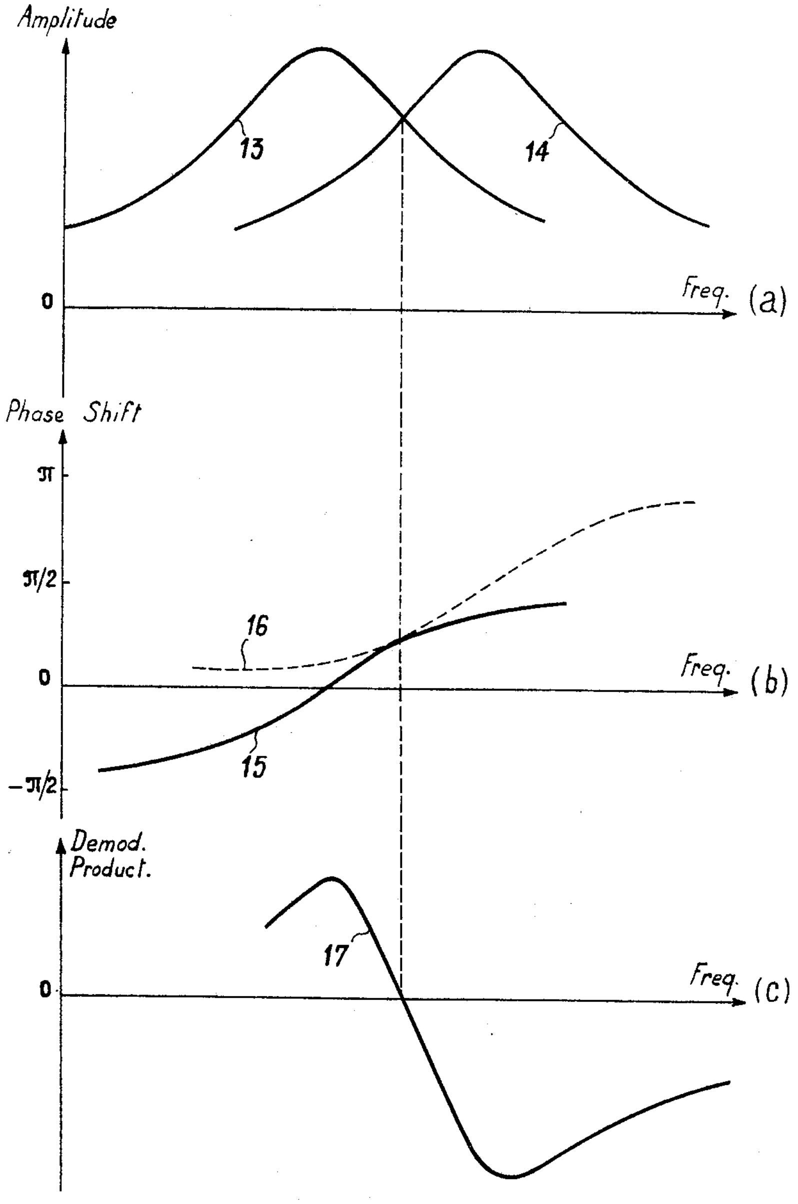
FIGURE 5 is a set of graphs illustrating the amplitude and phase-shift of the responses of the resonators employed in the device in the second type of embodiment of the invention as a function of the frequency of the incident wave, as well as other values occurring in its functioning.

The curves of FIGURE 5 show, as a function of the frequency, various values pertaining to the functioning of the second embodiment of the short-term spectral analysis network 33' described in connection with FIGURE 4.

Curves 13 and 14 of FIGURE 5, line *a*, show the amplitudes of signals developed across the resonators 301, 302.

The curves 15 and 16 of FIGURE 5, line *b*, show the phase-shift between the excitation signal of the resonators 301, 302 and their response after phase-shifting by the networks 3001, 3002.

Curve 17 shows the product of the demodulation carried out in the demodulator 3311.

The form of curve 17 is similar to that of the response curve of a frequency discriminator. For a suitable choice of the direction of variation of the instantaneous frequency of the oscillator 310, the device shown in FIGURE 5 requires a degenerative frequency feedback. A signal therefore appears at the output 36 of the short-term spectral analysis device 33', approximately proportional to the signal which modulates the incident wave. The said signal constitutes the desired estimated signal.

What is claimed is:

1. In a demodulator for a frequency-modulated wave including an estimation network delivering an estimated modulated signal, said network itself including a short-term spectral analyzer operating on said wave, an arrangement in which said analyzer comprises a mixer circuit fed at one input from said wave and at another input from a variable frequency auxiliary oscillator, a plurality of damped resonators fed through connection means from the output of said mixer circuit and having resonance frequencies staggered at regular mutual spacings with overlapping passbands, subtraction network means controlled by response signals respectively developed across said resonators for forming difference signals, a plurality of synchronous demodulator means each receiving on one hand one of said difference signals and on the other hand one of said response signals and each delivering further signals, means for combining all of said further signals into said estimated modulating signal, means for frequency-modulating said auxiliary oscillator by latter-said signal so as to bring back the frequency of said oscillator into the passband of one selected of said resonators, and means for applying said estimated modulating signal to a utilization terminal for said analyzer.

2. An analyzer arrangement as claimed in claim 1 in which said plurality of resonators consists of two resonators having different resonance frequencies and in which said subtraction network means consists of one subtraction network comparing in amplitude and phase said response signals respectively developed across said resonators to derive therefrom a difference signal, said plurality of demodulator means consisting of a single synchronous demodulator receiving on one hand said difference signal and on the other hand one of said response signals, and said frequency-modulating means controlling the frequency of said auxiliary oscillator by output of said synchronous demodulator.

3. An analyzer arrangement as claimed in claim 2, in which said connection means include two separate amplifiers.

4. An analyzer arrangement as claimed in claim 2, in which said synchronous demodulator is fed from said difference and response signals through means including two separator amplifiers and at least one phase-shifter.

5. An analyzer arrangement as claimed in claim 1 in which said plurality of resonators includes three resonators respectively having a lower, a middle and a higher resonance frequency, in which said difference signal forming means comprise a plurality of subtraction networks fed from two different of said response signals through further connection means including at least one phase shifter, and in which said plurality of synchronous demodulator means include a plurality of synchronous demodulators each fed from the output signal from one of said difference signals and one of said response signals.

6. An analyzer arrangement as claimed in claim 5, in which at least part of said synchronous demodulators are fed from said response signals through phase shifters.

7. An analyzer arrangement as claimed in claims 5, in which said first-named connection means include separator amplifiers.

8. An analyzer arrangement as claimed in claim 5, in which said synchronous demodulators are fed from said response signals through means including separator amplifiers.

References Cited

UNITED STATES PATENTS

| | | | |
|---|---|---|---|
| 3,103,009 | 9/1963 | Baker | 325—475 X |
| 3,217,262 | 11/1965 | Battail et al. | 329—112 X |
| 3,324,400 | 6/1967 | Battail et al. | 329—112 X |

ALFRED L. BRODY, Primary Examiner

U.S. Cl. X.R.

324—77; 325—346, 433, 460; 329—50, 122